(12) United States Patent
Nakayama (10) Patent No.: US 6,201,586 B1
(45) Date of Patent: Mar. 13, 2001

(54) LIQUID CRYSTAL DISPLAY HAVING STOPPERS ON BACK LIGHT OR OUTER FRAME OR HAVING PARTICULAR FEATURES OF THE LOW VOLTAGE WIRING

(75) Inventor: Tatsuya Nakayama, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 09/009,179

(22) Filed: Jan. 20, 1998

(30) Foreign Application Priority Data

Jan. 20, 1997 (JP) .................................... 9-007525
May 21, 1997 (JP) .................................... 9-131406

(51) Int. Cl.⁷ .................................................. G02F 1/1333
(52) U.S. Cl. .................................................. 349/58
(58) Field of Search ................................... 349/58, 60, 65, 349/67, 70

(56) References Cited

U.S. PATENT DOCUMENTS 5,659,376 * 8/1997 Uehara et al. ..................... 349/60
5,666,172 * 9/1997 Ida et al. ............................. 349/65
5,710,607 * 1/1998 Iwamoto et al. .................... 349/60
5,815,227 * 9/1998 Lee ..................................... 349/65

* cited by examiner

Primary Examiner—Walter J. Malinowski
(74) Attorney, Agent, or Firm—McDermott, Will & Emery (57) ABSTRACT

A liquid crystal display comprises: a plane light guide plate having an illumination surface which emits a light guided through a front end face portion from front face portion to outside; a liquid crystal panel which is disposed on front face of the illumination surface of the light guide plate and controls a transmission of light by electric signal supplied through a circuit board; a light source which is disposed adjacent to the front end face portion of the light guide plate in parallel thereto; and a main reflector attached to the front end portion of the light guide plate surrounding the light source; in which stoppers 6 are mounted on a holder 2 being a component of the light source to regulate free movement of the liquid crystal panel, whereby the liquid crystal display is small-sized. Further, a low voltage side wiring of a wiring section for supplying a power to the light source is formed by arranging a wiring material or wiring pattern of thin insulated strip on the light guide plate, etc.

17 Claims, 6 Drawing Sheets

LIQUID CRYSTAL DISPLAY HAVING STOPPERS ON BACK LIGHT OR OUTER FRAME OR HAVING PARTICULAR FEATURES OF THE LOW VOLTAGE WIRING

BACKGROUND OF THE INVENTION

1. Field of the Invention

The present invention relates to a liquid crystal display provided with a back light and, more particularly, to a supporting structure of a liquid crystal panel and a wiring structure for a light source of the back light.

2. Prior Arts

Figure 8:
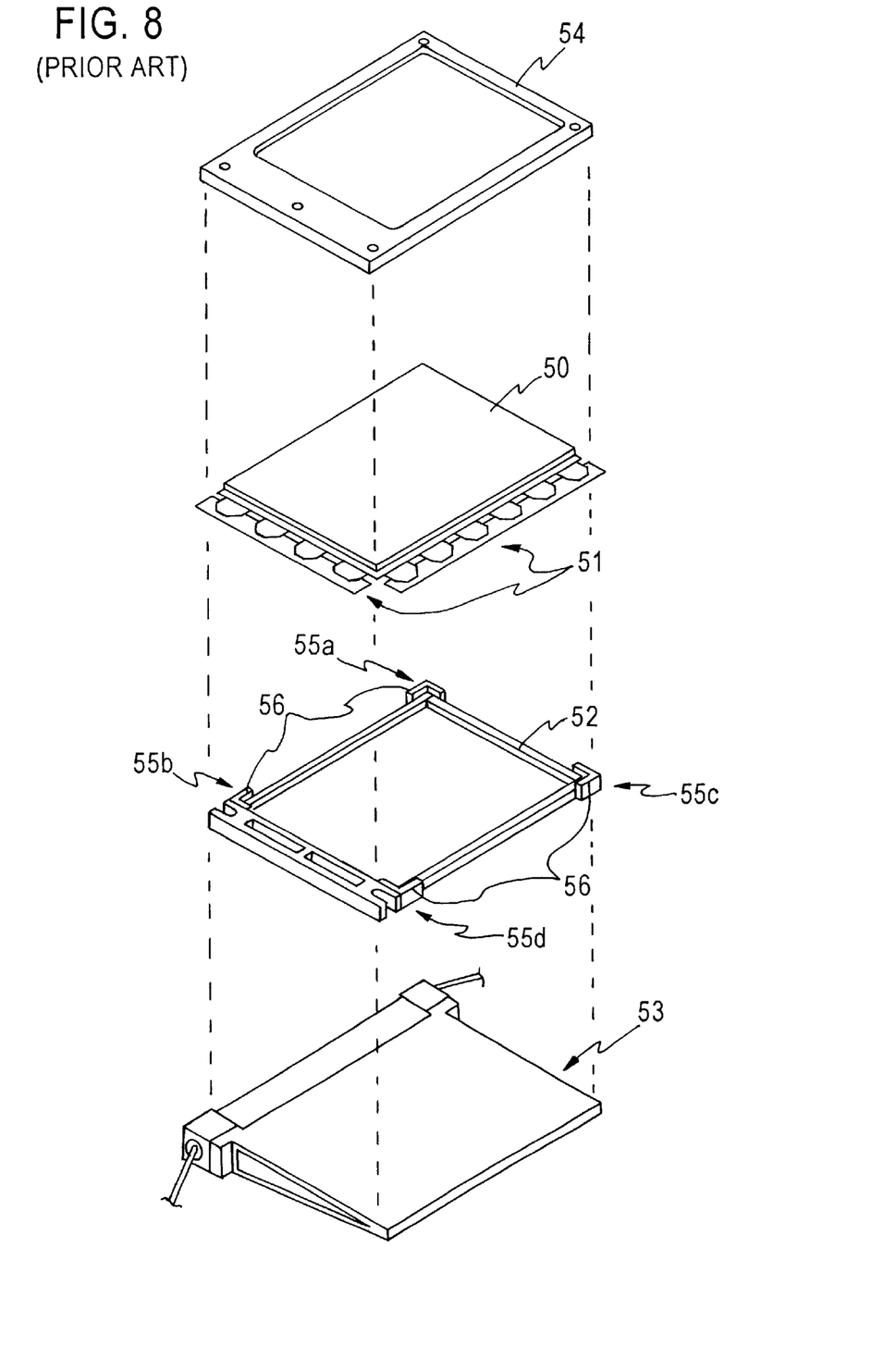
FIG. 8 is an exploded perspective view of the liquid crystal display according to the prior art.

Generally, as shown in FIG. 8, an entire liquid crystal display comprises: a liquid crystal panel 50 in which a display material such as liquid crystal is held between two opposed substrates; a circuit board 51 which is disposed for driving the panel 50; an edge type lighting device (back light) 53 which is disposed at the rear (on the backside) of the liquid crystal panel 50 through a plastic frame 52; and an outer frame 54 covering these elements.

In the conventional liquid crystal display of above structure, for the purpose of supporting the liquid crystal panel 50 on the back light 53, stoppers 56 are disposed at four corners 55a, 55b, 55c and 55d of the plastic frame 52 forming an integral one unit with the plastic frame 52.

Figure 9A:
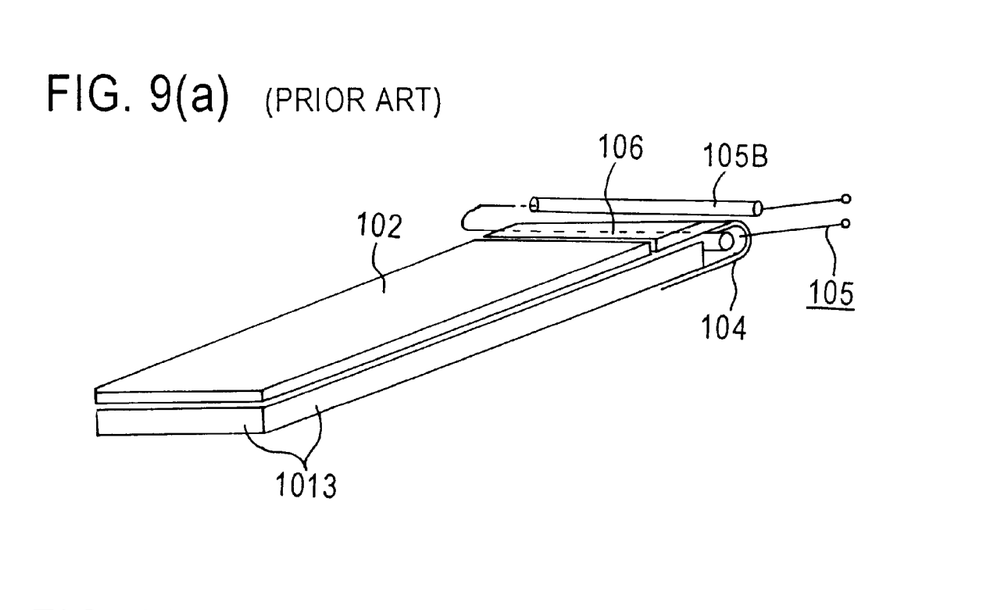
FIGS. 9(a) and (b) are views each showing the liquid crystal display according to the prior art, and in which (a) is a perspective view and (b) is a sectional view.

In the mentioned conventional liquid crystal display, a wiring section of the light source for the back light is arranged as described below. That is, as shown in FIG. 9a (perspective view in which outer frame 107 is omitted for the sake of easy understanding) and FIG. 9b (sectional view), the conventional liquid crystal display comprises: a light guide plate 101 having an illumination surface 1011A which is formed of a plane light-transmitting member composed of a lens film or the like on a front face portion 1011 thereof and having a subreflector composed of a reflection film on a back face portion 1014 and on a side end face portion 1013; a light source 103 which is disposed adjacent to a front end face portion 1012 of the mentioned light guide plate 101 and emits a light to be guided into the light guide plate 101; a liquid crystal panel 102 which is disposed on the front side of the illumination surface 1011A of the mentioned light guide plate 101 and controls the transmission of the light guided by the electric signal through the light guide plate 101; a main reflector 104 which is attached to the front end face portion 1012 of the mentioned light guide plate 101 by surrounding the mentioned light source; and a wiring section 105 for supplying a power to the mentioned light source. In the wiring section, a low voltage side wiring 105B was arranged insulatedly at the rear of the mentioned main reflector 104. The mentioned elements were all accommodated in the outer frame 107.

Figure 9B:
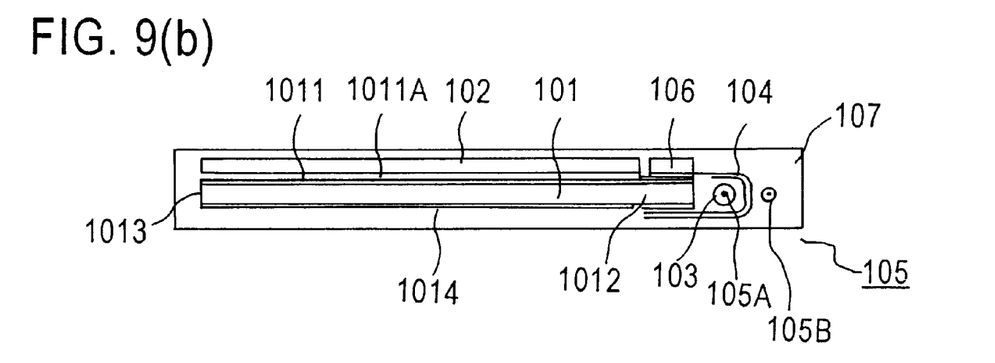

The light source 103 is lighted up by the power source supplied through the wiring section 105, and the illumination surface 1011A of the light guide plate 101 is illuminated with the light of the light source 103 from the rear of the liquid crystal panel 102. On the liquid crystal panel 102, the transmission of light at the portions corresponding to respective picture elements is controlled by electric signal, thereby depicting a required picture on the liquid crystal panel 102, and accordingly, the picture depicted on the liquid crystal panel 102 may be seen from the front side. The control signal is supplied from outside to the liquid crystal display 102 through the circuit board 106.

Since the conventional liquid crystal display is arranged as described above, in the aspect of supporting the liquid crystal panel, the stoppers 56 shown in FIG. 8 are formed at the time of forming the plastic frame 52, and at least 0.5 to 0.6 mm is required to secure a minimum thickness of the stoppers 56. Accordingly, when end face of the stoppers 56 is put in contact with the back side of the lamp, longitudinal dimension of the liquid crystal display is increased, and when internal face of the stoppers 56 is put in contact with the side end face of the lamp, lateral dimension of the liquid crystal display is increased. Furthermore, a space (thickness) for disposing the stoppers must be secured also on the opposite side of the lamp, and therefore dimensions of the liquid crystal display are increased as much as the lamp side.

In the aspect of wiring of the light source of the back light, as shown in FIGS. 9(a) and (b), since the insulated low voltage side wire 105B is arranged at the rear of the main reflector 104 for the power supply to the light source, a large dead space is produced round the low voltage side wire 105B, eventually resulting in the problem of large external dimensions of the entire liquid crystal display.

SUMMARY OF THE INVENTION

The present invention was made to solve the above-discussed problems and has an object of providing a liquid crystal display of which external dimensions are reduced by improving the supporting structure of the liquid crystal panel and the structure of the wiring section.

To accomplish the foregoing object, a liquid crystal display according to the invention comprises: a liquid crystal display panel; a circuit board for driving said liquid crystal panel; a plastic frame on which said liquid crystal panel is mounted; an edge type back light arranged on rear side of said liquid crystal panel; and an outer frame for covering the mentioned liquid crystal display panel, circuit board, plastic frame and back light; and is characterized by further comprising stoppers which are mounted on a component of said back light to regulate free movement of said liquid crystal panel.

The liquid crystal display according to the invention further comprises: a plane light guide plate having an illumination surface which emits a light guided through a front end face portion from front face portion to outside; a liquid crystal panel which is disposed on front face of the illumination surface of said light guide plate and controls a transmission of light by electric signal supplied through a circuit board; a light source which is disposed adjacent to the front end face portion of said light guide plate in parallel thereto; a main reflector attached to the front end portion of said light guide plate surrounding said light source; and a low voltage side wiring for said light source which is composed of an insulated strip wiring material.

In the liquid crystal display according to the invention, it is preferable that the low voltage side wiring of the light source is arranged by a conductive pattern.

It is preferable that the low voltage side wiring of the light source is arranged on the circuit board.

It is preferable that the low voltage side wiring of the light source is arranged on the front face portion of the light guide plate.

It is preferable that the low voltage side wiring of the light source is arranged on the rear face portion of the light guide plate.

It is preferable that the low voltage side wiring of the light source is formed on the main reflector.

It is preferable that the low voltage side wiring of the light source is arranged along the end faces of the light guide plate except the front end face portion thereof.

It is preferable that the low voltage side wiring of the light source is arranged on end face of a lens film disposed on the front face portion of the light guide plate.

It is preferable that the low voltage side wiring of the light source is composed of a transparent conductive film disposed on the front end face portion of the light guide plate.

It is preferable that the transparent conductive film has a mesh-like conductor which permits a light to transmit therethrough.

The invention of above structure has several advantages as described below.

Since the stoppers are formed on any component of the back light or on the outer frame in the invention, dimensions may be reduced corresponding to a difference in space between the stoppers and those formed on the conventional plastic frame, without adding any new member, whereby a liquid crystal display of smaller external size can be achieved.

Further, since the wiring section for the light source is composed of an insulating type thin wiring material, it is no more necessary to secure any independent space for the wiring section. As a result, the invention can contribute to small-sizing of a liquid crystal display.

Furthermore, not only safety may be improved but also noise mixture can be reduced just by grounding the low voltage side wiring, when required.

Other objects, features and advantages of the invention will become apparent in the course of the following description with reference to the accompanying drawings.

DESCRIPTION OF THE PREFERRED EMBODIMENTS

Several embodiments of the liquid crystal display according to the present invention are hereinafter described with reference to the accompanying drawings.

The liquid crystal display comprises a liquid crystal panel, a circuit board for driving the mentioned panel, a plastic frame on which the mentioned liquid crystal panel is mounted, an edge type back light which is disposed at the rear side of the mentioned liquid crystal panel, and an outer frame covering these elements.

Figure 1:
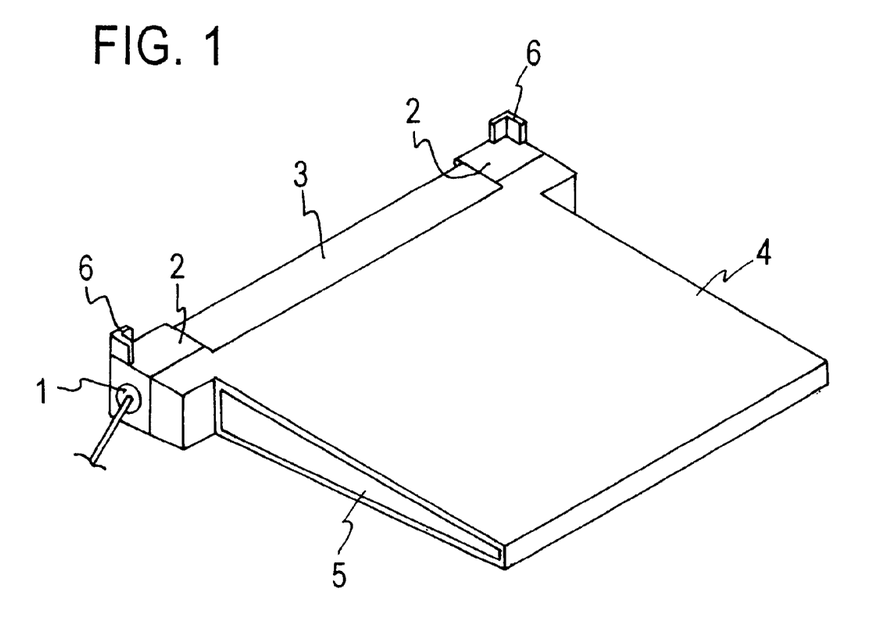
FIG. 1 is a perspective view showing an embodiment of the back light in the liquid crystal display according to the present invention.

Embodiment 1:

As shown in FIG. 1, the back light comprises: a lamp 1 serving as a light source; a holder 2 for supporting the mentioned lamp 1; a lamp reflector 3 for reflecting the light of the mentioned lamp 1; an acrylic light guide plate 4 in which line light source emitted from the mentioned lamp 1 is used as a surface light source; a diffusion film for diffusing the light and a lens film for converging the light which are both disposed on the mentioned light guide plate 4; and a reflection film for reflecting the light and a side reflector 5 which are disposed respectively under the mentioned light guide plate 4 and on the side face of the light guide plate 4.

A rubber holder made of silicon or a metal holder may be used as the mentioned holder 2. The mentioned reflector 3 and side reflector 5 may be made of PET (polyethylene terephthalate) or metal.

The mentioned back light is assembled in such a manner that after arranging the lamp 1 on the side face of the light guide plate 4, the reflector 3 to be arranged winding the lamp 1 is secured onto the upper face of the mentioned light guide plate 4 with a double-face adhesive tape.

The holder 2 being a component of the mentioned back light is provided with L-shaped stoppers 6 for positioning the liquid crystal panel by contacting.

In case that the mentioned holder 2 is a rubber holder, the mentioned stoppers 6 may be formed solidly in one unit with the use of die.

In this embodiment, because two stoppers which might be formed on the plastic frame are replaced by the stoppers 6 formed on the holder 2, external dimensions of the liquid crystal display may be reduced by a difference in thickness (remainder) left after subtracting a stopper thickness "b" of the rubber holder from a stopper thickness "a" of the plastic frame (thickness of mold frame). For example, where "a" is 0.6 to 0.7 mm and "b" is 0.3 to 0.4 mm, "a"−"b"=0.2 to 0.4 mm, and it becomes possible to reduce the dimensions of the liquid crystal display by this difference in thickness. Further, since the liquid crystal display is positioned by the mentioned stoppers 6, it becomes possible to regulate the free movement of the liquid crystal display. If the holder 2 is a rubber holder, it becomes possible to absorb a shock from outside by elasticity of the stoppers 6, and if the holder 2 is a metal holder, such a shock may be absorbed by applying a shock absorbing member (cushioning material) onto the metal stoppers 6. It is preferable that the cushioning member is 100 µm in thickness composed of a silicon resin of 20 to 50 (HS) in hardness.

Figure 2:
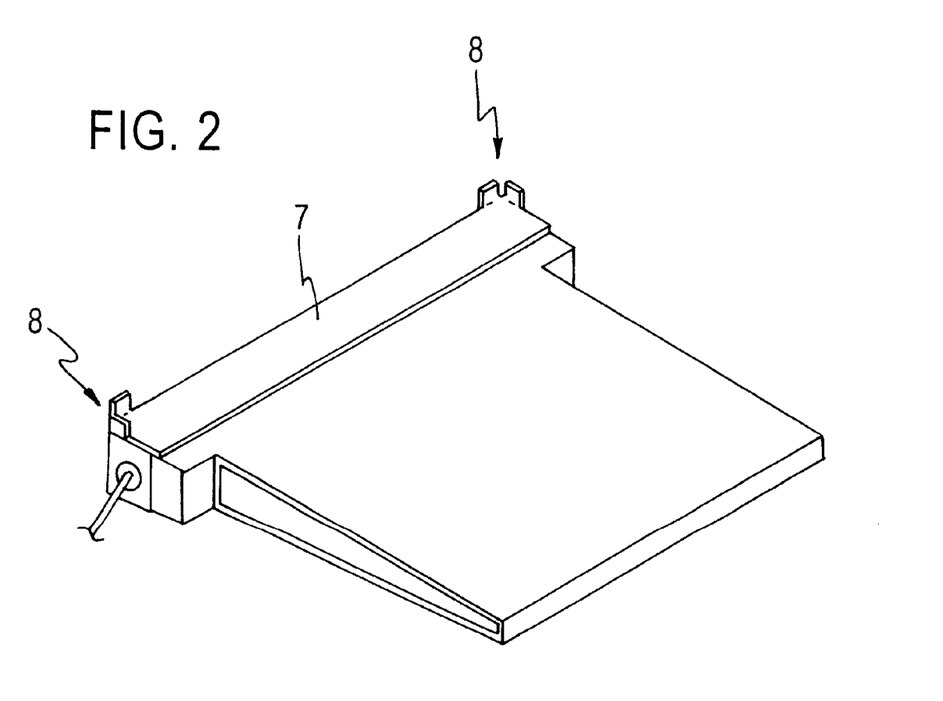
FIG. 2 is a perspective view showing another embodiment of the back light in FIG. 1.

Embodiment 2:

Another embodiment of the back light used in the liquid crystal display according to the invention is hereinafter described. In this embodiment, as shown in FIG. 2, almost L-shaped stoppers 8 are disposed at the ends of the reflector 7 being a component of the back light. If the reflector 7 is made of a metal, the stoppers 8 may be formed by cutting and bending the ends of the reflector 7.

In this embodiment, because two stoppers which might be formed on the plastic frame are replaced by the stoppers 6 formed on the ends of the reflector 7, external dimensions of the liquid crystal display may be reduced by a difference in thickness therebetween. Further, in the same manner as the foregoing embodiment 1, it is possible to apply a shock absorbing member (cushioning member) onto the surface of the stoppers 8 thereby absorbing a shock. It is preferable that the cushioning member is 100 µm in thickness composed of a silicon resin of 20 to 50 (HS) in hardness.

Figure 3:
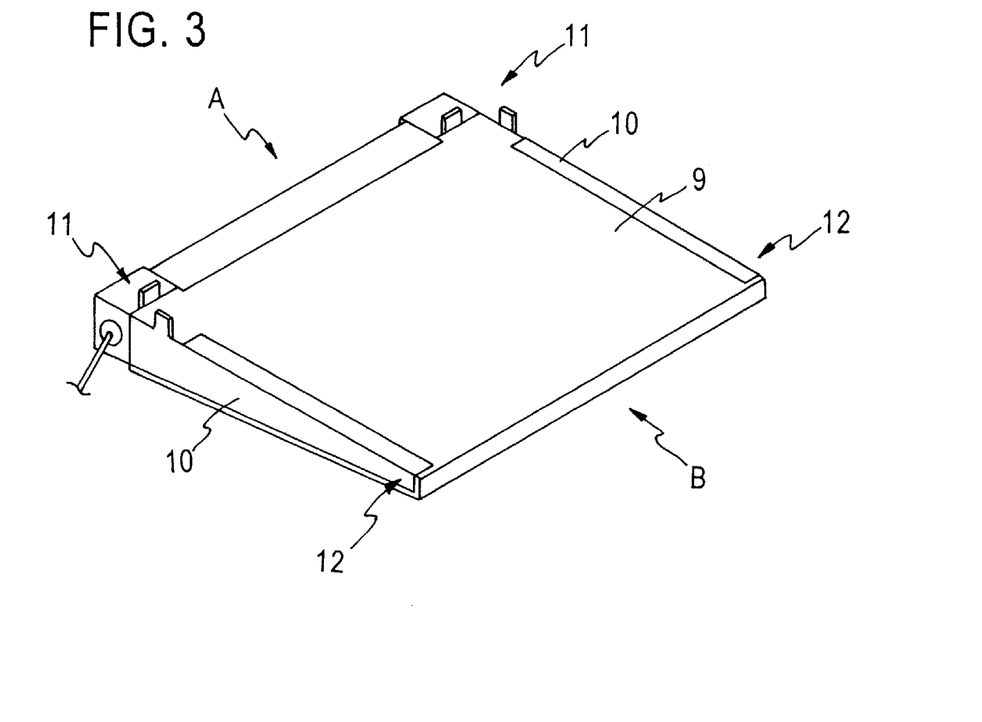
FIG. 3 is a perspective view showing a further embodiment of the back light in FIG. 1.

Embodiment 3:

A further embodiment of the back light used in the liquid crystal display according to the invention is hereinafter described. This embodiment is preferably employed when panel size is smaller than those shown in FIGS. 1 and 2. As shown in FIG. 3, L-shaped side reflectors 10 each being a component of the back light are formed and arranged on the side faces of the light guide plate 9, and an almost L-shaped stopper 11 is provided at one end of each side reflector 10. If the side reflectors 10 are made of a metal, the stoppers 11 may be formed by cutting and bending the ends of the side reflectors 10.

In this embodiment, because two stoppers which might be formed on the plastic frame are replaced by the stoppers 6 formed on the ends of the side reflectors 10, external dimensions of the liquid crystal display may be reduced by a difference in thickness therebetween. Further, since the liquid crystal display panel is positioned by the mentioned stopper 11, the liquid crystal panel is restrained from free movement. Furthermore, in the same manner as the foregoing embodiment 1, it is possible to apply any cushioning member onto the surface of the stoppers 11 thereby absorbing a shock.

Figure 4:
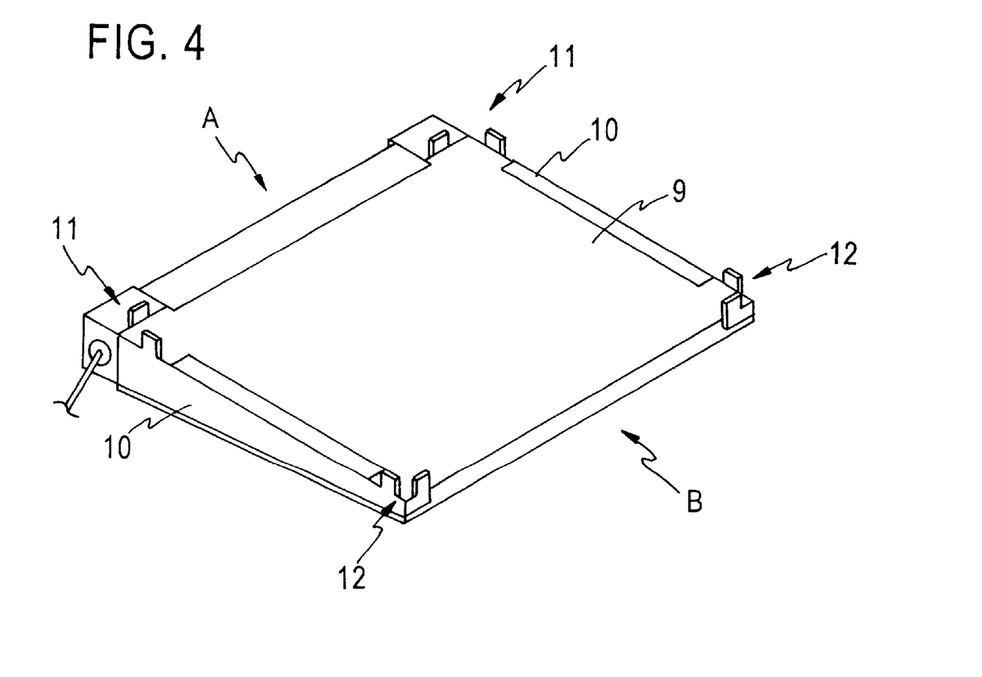
FIG. 4 is a perspective view showing a further embodiment of the back light in FIG. 3.

Embodiment 4:

Though the stoppers 11 are formed only on the lamp side A in the foregoing embodiment 3, the invention is not limited thereto and it is also preferable that the stoppers are formed likewise only at corner portions 12 on the opposite side B of the lamp. Further, it is also preferable that, as shown in FIG. 4, the stoppers are formed at corner portions 12 on the opposite side B of the lamp in addition to the stoppers 11 formed on the lamp side A. As a result of forming the stoppers both on the lamp side A and on the opposite side B of the lamp, external dimensions of the liquid crystal display may be further reduced as compared with those of the embodiments shown in FIGS. 1 to 3. More specifically, in the mentioned example of dimensions "a" and "b", the external dimensions may be reduced by about 0.5 to 1.00 mm in this embodiment.

Figure 5:
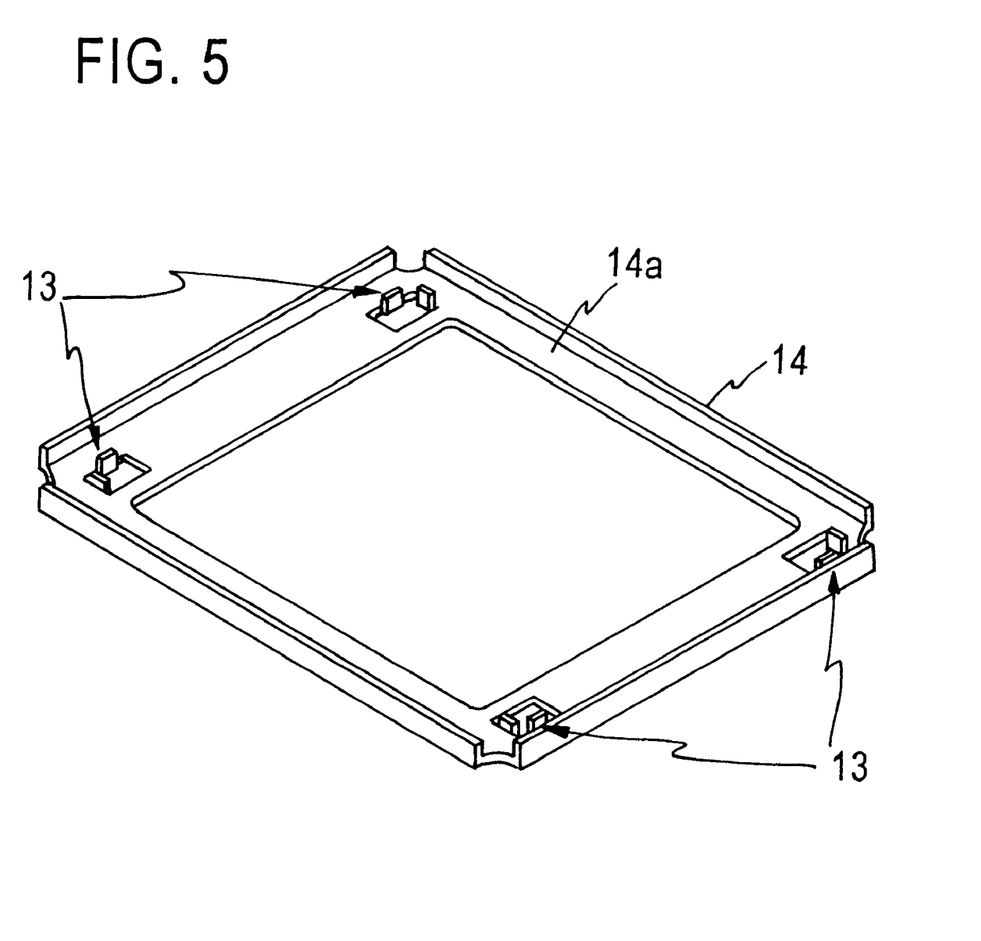
FIG. 5 is a perspective view showing an embodiment of the outer frame according to the invention.

Embodiment 5:

Then, an embodiment of an outer frame used in the liquid crystal display according to the invention is hereinafter described. In this embodiment, as shown in FIG. 5, stoppers 13 are provided on a back side 14a of the outer frame 14 being a component of the back light. If the outer frame 14 is made of a metal such as stainless steel, the stoppers 13 are formed by punching each of the portions corresponding to the corner portions of the liquid crystal panel into a ⊐-shape or the like, and raising the remaining portions. Alternatively, after extruding the portions corresponding to the corner portions of the liquid crystal panel, rib are formed, thereby forming the stoppers 13.

In this embodiment, four stoppers which might be formed on the plastic frames may be replaced by the stoppers 13 formed on the outer frame 14, and therefore the external dimensions of the liquid crystal display may be reduced by the thickness thereof. Further, since the liquid crystal panel is positioned by the mentioned stoppers 13, it becomes also possible to regulate the free movement of the liquid crystal display. Furtheremore, a shock on the surface of the stoppers 13 may be absorbed by applying any cushioning material composed of silicon or the like onto the metal stoppers 6 in the same manner as the foregoing embodiments.

Embodiment 6:

FIGS. 6 (a) to (e) are sectional views each showing an example of the liquid crystal display according to embodiment 6 of the invention. First, a common concept of these examples is described with reference to FIG. 6(a). In this drawing, reference numeral 4 designates a light guide plate having an illumination surface 41A which is formed of a plane light-transmitting member and provided on a front face portion 41 for emitting a light introduced from a front end face portion 42 to outside. Numeral 50 designates a liquid crystal panel which is arranged on front face of the illumination surface 41A of the mentioned light guide plate 4, and controls the transmission of light by an electric signal supplied through a circuit board 51. Numeral 1 is a light source which is arranged adjacent to the front end face portion of the mentioned light guide plate 4 in parallel thereto.

Figure 6A:
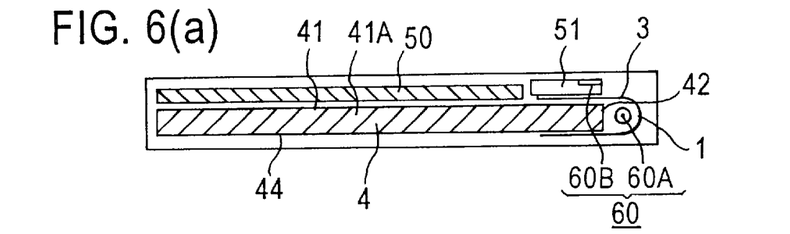
FIGS. 6(a) to (e) are sectional views each showing the liquid crystal display according to embodiment 6 of the invention, and in which (a) is a first example, (b) is a second example, (c) is a third example, (d) is a fourth example, and (e) is a fifth example.

Numeral 3 is a lamp reflector which is provided on the front end face portion 42 of the mentioned light guide plate 4 by surrounding the mentioned light source 1 and guides the light from the mentioned light source 1 efficiently to the mentioned light guide plate 4. Numeral 60 is a wiring section for supplying a power to the light source 1, and which comprises a high voltage side wiring 60A and a low voltage side wiring 60B. Numeral 51 is a circuit board on which a circuit is mounted for converting a control signal supplied from outside to a signal suitable for the liquid crystal panel 50. It is to be noted that various examples may be formed depending upon where and how the low voltage side wiring 60B of the wiring section 60 is arranged. Furthermore, just by grounding the low voltage side wiring, not only safety may be improved but also noise mixture may be reduced.

In the first example, as shown in FIG. 6(a), the low voltage side wiring 60B of the light source 1 is arranged by patterning on the circuit board 51 which controls the liquid crystal panel 50.

Figure 6B:
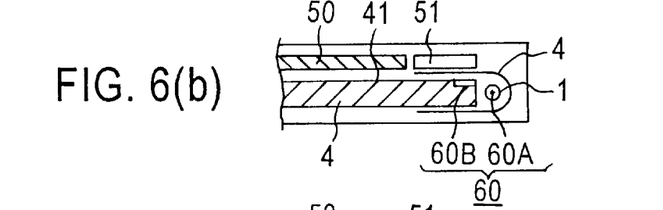

In the second example, as shown in FIG. 6(b), the low voltage side wiring 60B is arranged by patterning or by pasting up a thin wiring sheet on the end portion of the front face portion 41 of the light guide plate 4.

Figure 6C:
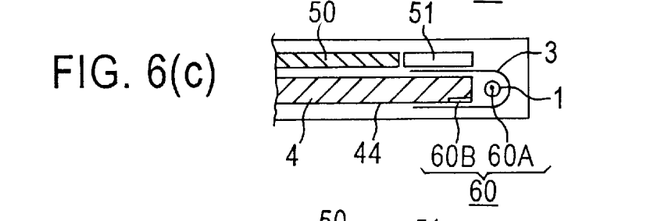

In the third example, as shown in FIG. 6(c), the low voltage side wiring 60B is arranged by patterning or by pasting up a thin wiring sheet on the end portion of the rear face portion 44 of the light guide plate 4.

Figure 6D:
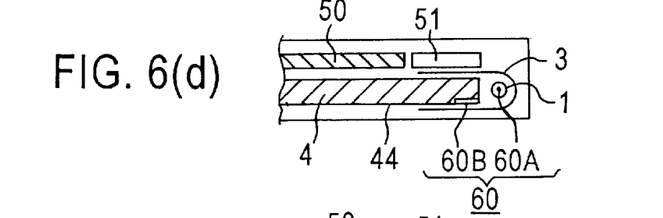

In the fourth example, as shown in FIG. 6(d), the low-voltage side wiring 60B is arranged by patterning such as deposition on the lamp reflector 3 or by pasting up a thin wiring sheet thereon.

Figure 6E:
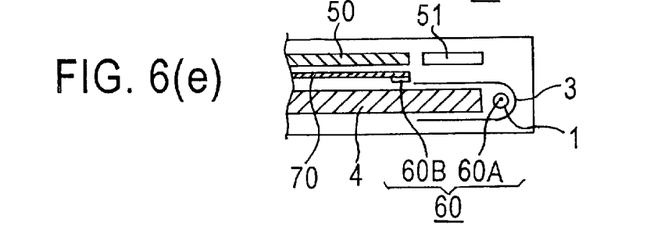

In the fifth example, as shown in FIG. 6(e), the low voltage side wiring 60B is arranged on the end portion of the light guide plate 4 side of the lens film 70 disposed on the front face portion of the light guide plate 4.

It is also preferable that the low voltage side wiring 60B is arranged on the end portion of the liquid crystal panel of the lens film 70.

In the sixth example, the low voltage side wiring 60B of the light source is arranged by wiring so as to surround along the end face of the light guide plate except the front end face portion thereof.

Figure 7:
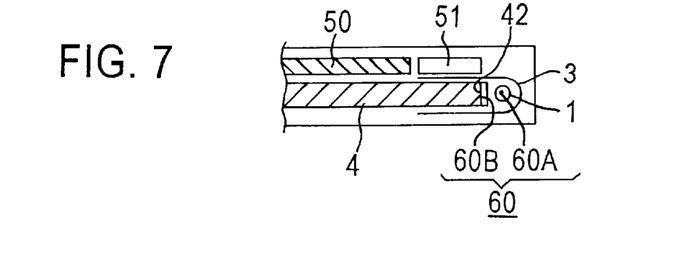
FIG. 7 is a sectional view showing the liquid crystal display according to embodiment 7 of the invention.

Embodiment 7:

As shown in FIG. 7, a conductive pattern composed of a transparent conductor is arranged on the front end face portion 42 of the light guide plate 4, thereby the low voltage side wiring 60B of the wiring section 60 being formed.

When forming the conductive pattern arranged on the end face portion 42 of the light guide plate 4 by combining the transparent conductor with a mesh-like opaque conductor which permits a light to pass through, current capacity may be increased.

It is further understood by those skilled in the art that the foregoing description relates to only preferred embodiments of the invention, and that various changes and modifications may be made in the invention without departing from the spirit and scope thereof.

What is claimed is:

1. A liquid crystal display comprising:
a liquid crystal display panel; a circuit board for drive said liquid crystal display panel; a plastic frame on which said liquid crystal display panel is mounted; an edge type back light arranged on rear side of said liquid crystal panel; and an outer frame for covering said liquid crystal display panel, said circuit board, said plastic frame and said back light; in which stoppers are mounted on a component of said back light to regulate movement of said liquid crystal panel in two orthogonal directions.

2. A liquid crystal display as defined in claim 1, wherein said component is a holder for supporting the light source.

3. A liquid crystal display as defined in claim 1, wherein said component is a reflector arranged around the light source.

4. A liquid crystal display as defined in claim 1, wherein said component is a side reflector arranged on a side face of the light guide plate.

5. A liquid crystal display as defined in claim 1, wherein said stoppers are provided with a shock absorbing member.

6. A liquid crystal display comprising:
a liquid crystal display panel; a circuit board for driving said liquid crystal display panel; a plastic frame on which said liquid crystal panel is mounted; an edge type back light arranged on rear side of said liquid crystal panel; and an outer frame for covering said liquid crystal display panel, said circuit board, said plastic frame and said back light; in which stoppers are mounted on a back face of said outer frame to regulate movement of said liquid crystal panel in two orthogonal directions.

7. A liquid crystal display as defined in claim 6, wherein said stoppers are provided with a shock absorbing member.

8. A liquid crystal display comprising:
a plane light guide plate having an illumination surface which emits a light guided through a front end face portion and the front face portion; a liquid crystal panel which is disposed on a front face of the illumination surface of said light guide plate and controls a transmission of light by electric signal supplied through a circuit board; a light source which is disposed adjacent to the front end face portion of said light guide plate in parallel thereto; a main reflector attached to the front end portion of said light guide plate surrounding said light sources; and a low voltage side wiring for said light source which is composed of an insulated strip wiring material.

9. A liquid crystal display as defined in claim 8, wherein the low voltage side wiring of the light source is arranged on the circuit board.

10. A liquid crystal display as defined in claim 8, wherein the low voltage side wiring of the light source is arranged on the front face portion of the light guide plate.

11. A liquid crystal display as defined in claim 8, wherein the low voltage side wiring of the light source is arranged on the rear face portion of the light guide plate.

12. A liquid crystal display as defined in claim 8, wherein the low voltage side wiring of the light source is arranged on the surface of the main reflector.

13. A liquid crystal display as defined in claim 8, wherein the low voltage side wiring of the light source is arranged along the end faces of the light guide plate except the front end face portion thereof.

14. A liquid crystal display as defined in claim 8, wherein the low voltage side wiring of the light source is arranged on an end face of a lens film disposed on the front face portion of the light guide plate.

15. A liquid crystal display comprising:
a plane light guide plate having an illumination surface which emits a light guided through a front end face portion and the front face portion; a liquid crystal panel which is disposed on a front face of the illumination surface of said light guide plate and controls a transmission of light by electric signal supplied through a circuit board; a light source which is disposed adjacent to the front end face portion of said light guide plate in parallel thereto; a main reflector attached to the front end portion of said light guide plate surrounding said light sources; and a low voltage side wiring for said light source which is composed of a conductive pattern.

16. A liquid crystal display comprising:
a plane light guide plate having an illumination surface which emits a light guided through a front end face portion and the front face portion; a liquid crystal panel which is disposed on a front face of the illumination surface of said light guide plate and controls a transmission of light by electrical signal supplied through a circuit board; a light source which is disposed adjacent to the front end face portion of said light guide plate in parallel thereto; a main reflector attached to the front end portion of said light guide plate surrounding said light sources; and a low voltage side wiring for said light source which is composed of a transparent conductive film disposed on the front end face portion of the light guide plate.

17. A liquid crystal display as defined in claim 16, wherein the transparent conductive film has a mesh-like conductor which permits a light to transmit therethrough.

* * * * *